April 28, 1953          W. C. HEATH          2,636,344

INTERNAL-COMBUSTION TURBINE WITH SELF-COOLING VANES

Filed Oct. 28, 1946

INVENTOR.
WILLIAM C. HEATH
BY
ATTORNEY

Patented Apr. 28, 1953

2,636,344

UNITED STATES PATENT OFFICE

2,636,344

INTERNAL-COMBUSTION TURBINE WITH SELF-COOLING VANES

William C. Heath, La Mesa, Calif., assignor to Solar Aircraft Company, San Diego, Calif., a corporation of California Application October 28, 1946, Serial No. 706,266

7 Claims. (Cl. 60—35.6)

This invention relates to internal combustion engines of the rotary type employing a turbine driven by hot products of combustion.

An object of the invention is to provide a turbine construction in which the blades are automatically cooled and kept at a temperature low enough to insure long life and reliable service.

Another object is to provide a construction of internal combustion turbine in which means is provided for cooling the turbine blades without increasing the weight of the engine.

Another object is to provide a construction that not only cools the turbine blades and thereby prolongs their life but at the same time increases the efficiency of the engine.

Another object is to provide a turbine construction which produces relatively complete combustion of the fuel.

A further object is to provide a rotary turbine driven by the products of combustion of a primary fuel-air mixture, with means for introducing a secondary fuel-air mixture into the high velocity hot products of combustion to be thereby ignited for the propagation of flame in the exhaust stream from the turbine.

It is old in the art to cool the guide vanes or turbine vanes of internal combustion engines by making the vanes hollow and circulating a coolant therethrough. While these prior arrangements serve the purpose of cooling the vanes, they are objectionable because they require an external coolant having substantial weight, and because considerable energy is wasted in the coolant.

The present invention also employs hollow vanes but differs from the prior devices in that the coolant employed is a portion of the fuel and air that is used for combustion in the turbine. This arrangement has the substantial advantages that: (1) It eliminates the weight of a separate coolant; (2) it preheats the portion of the fuel-air mixture that is used for coolant purposes; (3) the heated air and fuel is discharged from the vanes into the combustion space of the engine and thereby eliminates the objectionable feature of a return pipe for disposing of a conventional coolant.

A full understanding of the invention may be had from the detailed description that follows with reference to the drawing, in which.

Figure 1:
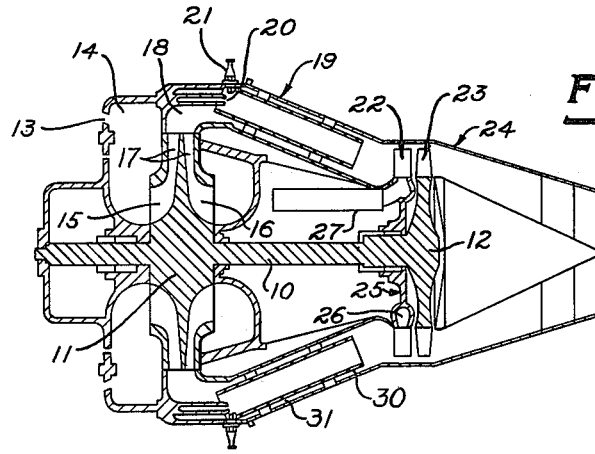
Fig. 1 is a longitudinal section showing a conventional form of a jet engine to which the present invention is applied.

Referring to Fig. 1, a conventional type of internal combustion turbine is shown schematically. Essentially, it comprises a rotatable shaft 10 suitably supported for rotation and having on its front end the rotor 11 of a compressor, and having on its rear end the rotor 12 of a gas turbine. In operation, air enters through openings 13 into an annular space 14 from which it flows into inlet openings 15 and 16 in the front and rear sides respectively of the rotor 11 of the air compressor. The air is discharged through radial passages 17 in the rotor 11 and into rearwardly extending passages 18, which deliver it into a plurality of rearwardly and inwardly extending combustion pipes 19. As the air enters each combustion pipe 19 it is mixed with atomized fuel from a jet 20, and the mixture is ignited by a spark plug 21. The burning gases, as they are discharged from the pipes 19, pass first through stationary deflector vanes 22 and then impinge on the turbine vanes 23, thereby imparting torque to the shaft 10 to maintain it in rotation. After passing the turbine vanes 23 the products of combustion enter a conventional tail cone assembly 24, from which they are discharged to the atmosphere.

Figure 2:
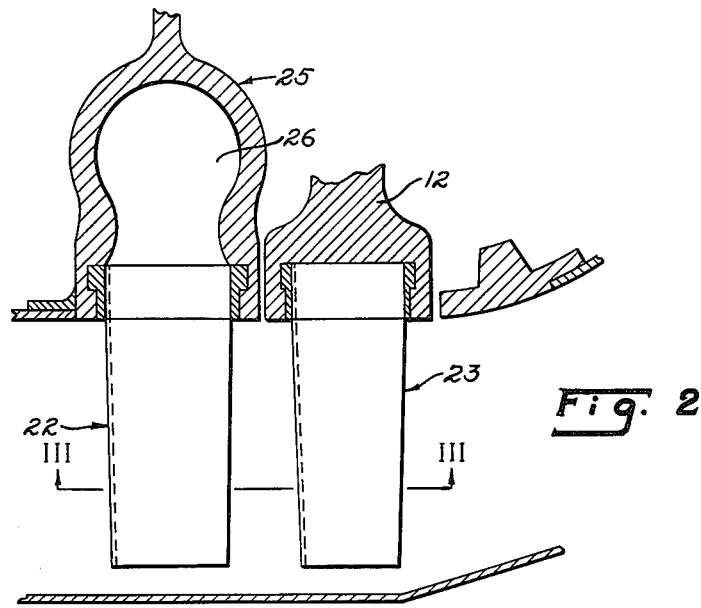
Fig. 2 is an enlarged section taken in the same plane as Fig. 1 to better show the construction of the guide vanes and turbine vanes.
Figure 3:
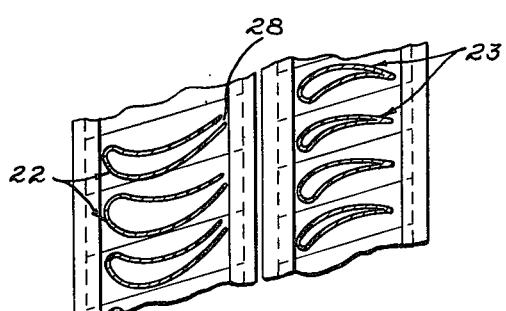
Fig. 3 is a detail cross section through the guide vanes and the turbine vanes, the section being taken in the plane III—III of Fig. 2.

The structure so far described is conventional. The present invention resides in apparatus for and a method of cooling the vanes 22. To this end, the vanes 22 (Figs. 2 and 3) are made hollow and are connected at their inner ends to a stationary supporting manifold 25 having an annular passage 26 which is connected to a carburetor 27.

The hollow vanes 22 are preferably of airfoil shape and have thin slot-like outlet openings 28 (Fig. 3) along their rear edges for the discharge of fuel and air mixture.

Air can be supplied to the carburetor 27 by conventional pressure equipment such as a supercharger (not shown). However it is not always necessary to supply the fuel-air mixture to the manifold under pressure, because the ambient pressure adjacent the slots 28 is low and is usually below atmospheric pressure.

In operation, the mixture of fuel and air supplied by the carburetor 27 flows continuously through the manifold 26 and the guide vanes 22 and from the guide vanes through the slots 28, where it mixes with the stream of hot gases from the combustion pipes 19. The speed of flow of the fuel and air mixture through the openings 28 in the guide vanes can be controlled and made sufficiently high to prevent the fuel-air mixture from burning until after it has passed the turbine vanes 23. In this way, the guide vanes 22 are directly cooled, and the turbine vanes 23 are indirectly cooled.

It is to be understood that, if desired, the turbine vanes 23 can also be cooled in the same manner as the guide vanes 22, although it is a little more difficult to supply the fuel-air mixture to the turbine vanes because of the fact that they are revolving.

The combustion pipes 19 are preferably provided with inner sleeves 30 which define an inner passage within the sleeve and an outer annular passage 31 between the sleeve and the combustion pipes 19. The fuel discharged from the jets 20 enters the inner sleeve 30 with a portion of the air, and is burned. On the other hand, the remaining unburned air passes through the annular passages 31 to provide additional air for combustion of fuel issuing from the passages 28 in the guide vanes 22. This permits the use of a richer mixture for cooling purposes within the guide vanes 22, thereby producing a stronger cooling effect by virtue of the heat of vaporization of the fuel. The auxiliary air supplied through the annular passages 31 is also useful in that it combines with the exhaust gases issuing from the sleeves 30 and the fuel-air mixture from vanes 22 to complete combustion of any unburned fuel components.

These hot gases and the auxiliary air from passages 31 have a sufficiently high velocity passing over vanes 22 to create an aspirating effect with respect to the discharge slots 28. This insures withdrawal of the air-fuel mixture from vanes 22 and its entrainment and discharge in a downstream direction against the leading edges of vanes 23 at a velocity sufficient to effect complete atomization of the fuel element and downstream flow of the atomized fuel element and auxiliary air beyond vanes 23 at a rate relative to the temperature of the hot combustion gases so that ignition of the secondary fuel will occur at the downstream side of the rotor vanes 23. Expansion of the additional gases of combustion from the secondary fuel within the cone 24 augments the propulsive thrust and also results in the propagation of flame in the exhaust stream discharged at high velocity from the rear end of the cone 24.

It will be apparent therefore that the invention not only provides for the effective cooling of the guide vanes and turbine blades but also provides the means for obtaining additional thrust and more complete combustion.

Although for the purpose of explaining the invention a particular embodiment thereof has been described in some detail, various departures from the particular construction shown herein can be made without departing from the invention which is to be limited only to the extent set forth in the appended claims.

I claim:

1. A jet type power plant comprising means for mixing fuel with primary air and burning it; a turbine structure having a turbine rotor and hollow stator vanes upstream of said turbine rotor and formed with discharge orifices in the trailing edges thereof; means for directing the hot products of said combustion past said vanes, and means including a duct for supplying and delivering an auxiliary over-rich mixture of fuel and air through said hollow vanes to said orifices for injection into said hot products of combustion upstream of said turbine rotor and at a velocity to assure burning of said auxiliary mixture at a point beyond said turbine rotor but upstream from the exhaust outlet.

2. A jet type power plant comprising means for producing primary combustion of a fuel-air mixture; a turbine structure having hollow stator vanes with discharge passages therein opening in the downstream direction of flow of gases through said gas turbine and rotor vanes downstream of said stator vanes; means for conducting the products of said primary combustion through said turbine past said vanes; means for supplying auxiliary air to said turbine structure with said products of combustion; and means for supplying an over-rich fuel mixture through said stator vanes in a downstream direction into the stream of combustion products and auxiliary air moving through said turbine structure at a sufficient velocity to effect cooling of said rotor vanes and to supply a combustible mixture to a point beyond said rotor vanes but upstream from the exhaust outlet for burning.

3. In a jet type power plant comprising an air compressor, a combustion chamber supplied with air by said compressor, a primary fuel supply structure for said combustion chamber, a turbine driven by the gases from said combustion chamber for driving said compressor: a secondary fuel supply structure between said primary structure and said turbine rotor comprising fuel mixture injecting passages arranged to discharge in a downstream direction thereby introducing a secondary fuel mixture into said gases of combustion in a downstream direction at a velocity such that ignition and burning thereof occur downstream of said turbine.

4. A jet engine comprising, an air compressor, a combustion chamber receiving air from the air compressor, a gas turbine having stator vanes and a rotor adapted to be driven by heated gases flowing from the combustion chamber, a main drive shaft connecting the air compressor rotor and the gas turbine rotor, a tail pipe and exhaust nozzle downstream of the gas turbine for conducting heated exhaust gases from the turbine and for discharging said gases into the atmosphere rearwardly of the jet engine, a primary fuel nozzle in the combustion chamber adapted to inject primary fuel for combustion thereof in said combustion chamber, and a secondary fuel nozzle comprising said stator vanes adjacent to and upstream of the gas turbine rotor adapted to inject secondary fuel into the stream of heated gases flowing from the combustion chamber through the gas turbine for combustion of said secondary fuel after an ignition delay during which said secondary fuel is carried through said gas turbine rotor, whereby combustion of said secondary fuel will be accomplished a definite distance rearwardly of said gas turbine.

5. In a jet type power plant in which hot exhaust gases containing excess air from combustion of a fuel-air mixture are discharged past turbine rotor vanes, the method which comprises injecting fuel independently of and upstream of all of said vanes and across the stream of hot gases and air moving past said vanes to distribute a cooling flow of initially non-combustible unburned auxiliary fuel over the exposed surfaces of said vanes and to assure a combustible mixture and burning with the development of added thrust substantially downstream of said vanes but upstream from the exhaust outlet.

6. In a jet type power plant in which hot exhaust gases from combustion of a fuel-air mixture are discharged past turbine rotor vanes, the method of cooling said vanes and providing more complete combustion and additional thrust which comprises mixing combustion air with said hot gases upstream from said vanes and injecting an auxiliary flow of over-rich, initially non-combustible, unburned fuel into the stream of hot gases and air moving exterior of said vanes in a downstream direction at velocities sufficient to a sure flow of said unburned fuel past said vanes and burning thereof substantially downstream of said vanes but upstream from the exhaust outlet.

7. A turbo-jet engine, comprising an air compressor, a combustion chamber rearwardly of the compressor receiving air at one end from the air compressor, a gas turbine at the other end of the combustion chamber having stationary vanes and rotating vanes adapted to be driven by heated gases flowing from the combustion chamber, a main drive shaft connecting the air compressor and the gas turbine, a tail pipe and exhaust nozzle rearwardly of the gas turbine for conducting heated exhaust gases from the turbine and for discharging said gases into the atmosphere rearwardly of the turbo-jet engine, a primary fuel nozzle in the combustion chamber adjacent to the air compressor adapted to inject primary fuel for combustion thereof in said combustion chamber, a secondary fuel nozzle adjacent to and forwardly of the rotating vanes of the gas turbine adapted to inject seconary fuel into the stream of heated gases flowing from the combustion chamber through the turbine for combustion of said secondary fuel after an ignition delay during which said secondary fuel is carried through said turbine, whereby combustion of said secondary fuel will be accomplished a definite distance rearwardly of said turbine.

WILLIAM C. HEATH.

References Cited in the file of this patent

UNITED STATES PATENTS

| Number | Name | Date |
|---|---|---|
| 2,242,767 | Traupel | May 20, 1941 |
| 2,479,777 | Price | Aug. 23, 1949 |

FOREIGN PATENTS

| Number | Country | Date |
|---|---|---|
| 781,057 | France | Feb. 18, 1935 |
| 346,599 | Germany | Jan. 5, 1922 |